US012717678B2

(12) United States Patent
Nakatsuka et al.

(10) Patent No.: US 12,717,678 B2
(45) Date of Patent: Aug. 25, 2026

(54) MEMORY SYSTEM AND INFORMATION PROCESSING SYSTEM

(71) Applicant: Kioxia Corporation, Tokyo (JP)

(72) Inventors: Hiroyasu Nakatsuka, Tokyo (JP); Devesh Kumar Rai, Irvine, CA (US)

(73) Assignee: Kioxia Corporation, Tokyo (JP)

( * ) Notice: Subject to any disclaimer, the term of this patent is extended or adjusted under 35 U.S.C. 154(b) by 54 days.

(21) Appl. No.: 18/978,657

(22) Filed: Dec. 12, 2024

(65) Prior Publication Data

US 2026/0127073 A1 May 7, 2026

Related U.S. Application Data

(60) Provisional application No. 63/687,839, filed on Aug. 28, 2024.

(51) Int. Cl.
*G06F 11/00* (2006.01)
*G06F 11/10* (2006.01)

(52) U.S. Cl.
CPC ........ *G06F 11/108* (2013.01); *G06F 11/1096* (2013.01)

(58) Field of Classification Search
CPC . G06F 11/1076; G06F 11/108; G06F 11/1096
See application file for complete search history.

(56) References Cited

U.S. PATENT DOCUMENTS 8,015,435 B2 * 9/2011 Igashira .............. G06F 11/1076
714/6.22
2017/0228286 A1 * 8/2017 Koutoupis .......... G06F 11/1084
2018/0039540 A1 2/2018 Lu
2021/0311661 A1 10/2021 Kotzur et al.
2022/0137835 A1 5/2022 Malakapalli et al.
2022/0187992 A1 6/2022 Malakapalli et al.
2023/0083752 A1 3/2023 Agarwala et al.
2023/0143435 A1 5/2023 Han et al.
2024/0103731 A1 3/2024 Saluja
2024/0232009 A1 7/2024 Rai et al.
2024/0248797 A1 7/2024 Nakatsuka et al.

FOREIGN PATENT DOCUMENTS

DE 102023119958 A1 7/2024

OTHER PUBLICATIONS

U.S. Appl. No. 18/758,495, filed Jun. 28, 2024, Title: Non-Volatile Storage Device Offloading, Inventor: Devesh Kumar Rai, 76 pages.
U.S. Appl. No. 18/758,583, filed Jun. 28, 2024, Title: Non-Volatile Storage Device Offloading in a Multi-Data Node Environment, Inventor: Devesh Kumar Rai et al., 62 pages.

* cited by examiner

*Primary Examiner* — Marc Duncan
(74) *Attorney, Agent, or Firm* — Maier & Maier, PLLC

(57) ABSTRACT

According to one embodiment, a memory system includes a nonvolatile memory and a controller. The controller is configured to generate first parity based on first data in a first memory system and second data in a second memory system, writes the first parity to the nonvolatile memory, receive third data that is updated data of the first data from a host, receive the first data from the first memory system, read the first parity from the nonvolatile memory, generate second parity based on the first parity, the first data, and the third data, generate first rebuilt data based on the second parity, the first parity, and the first data, and compare the first rebuilt data with the third data.

20 Claims, 5 Drawing Sheets

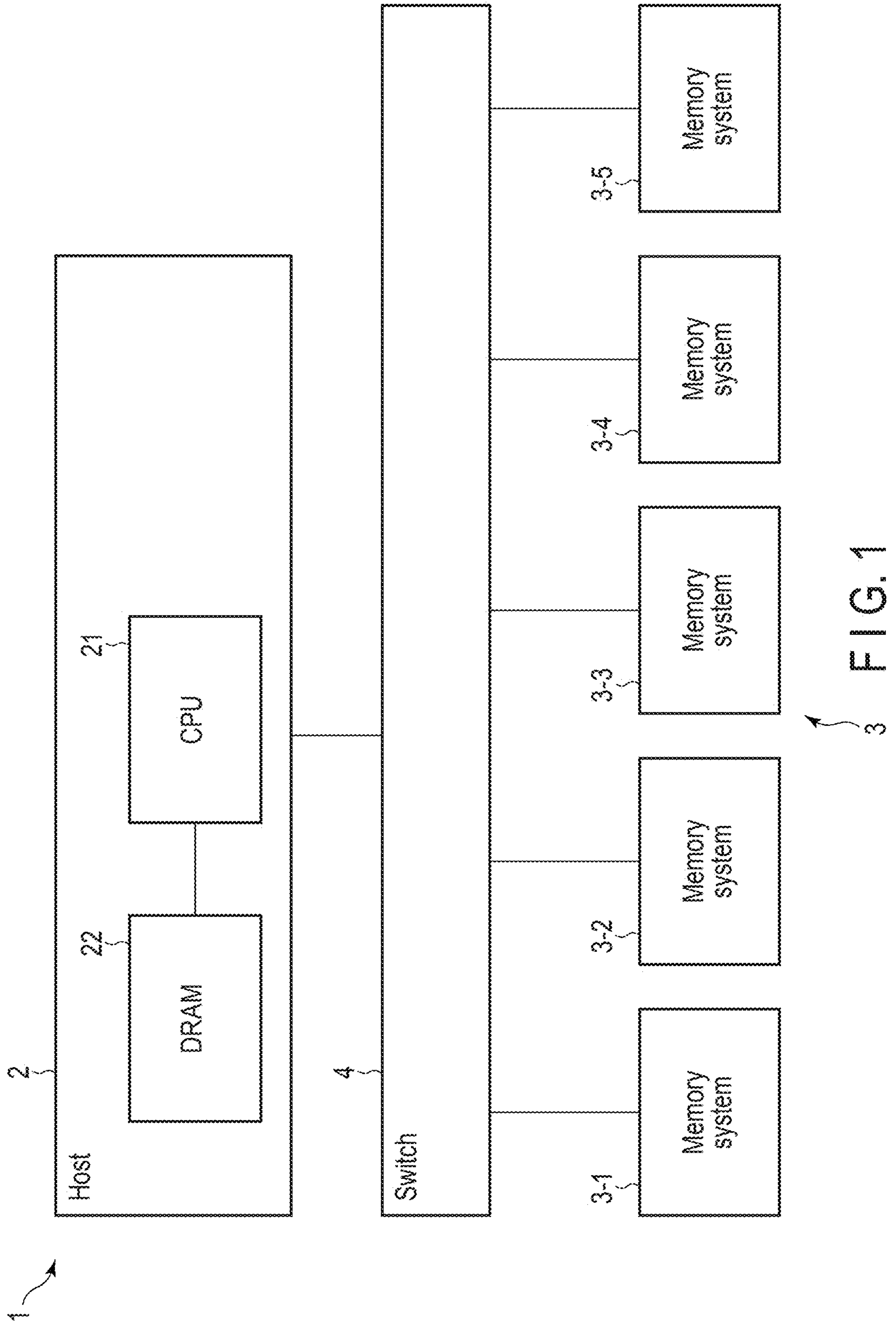
F I G. 1

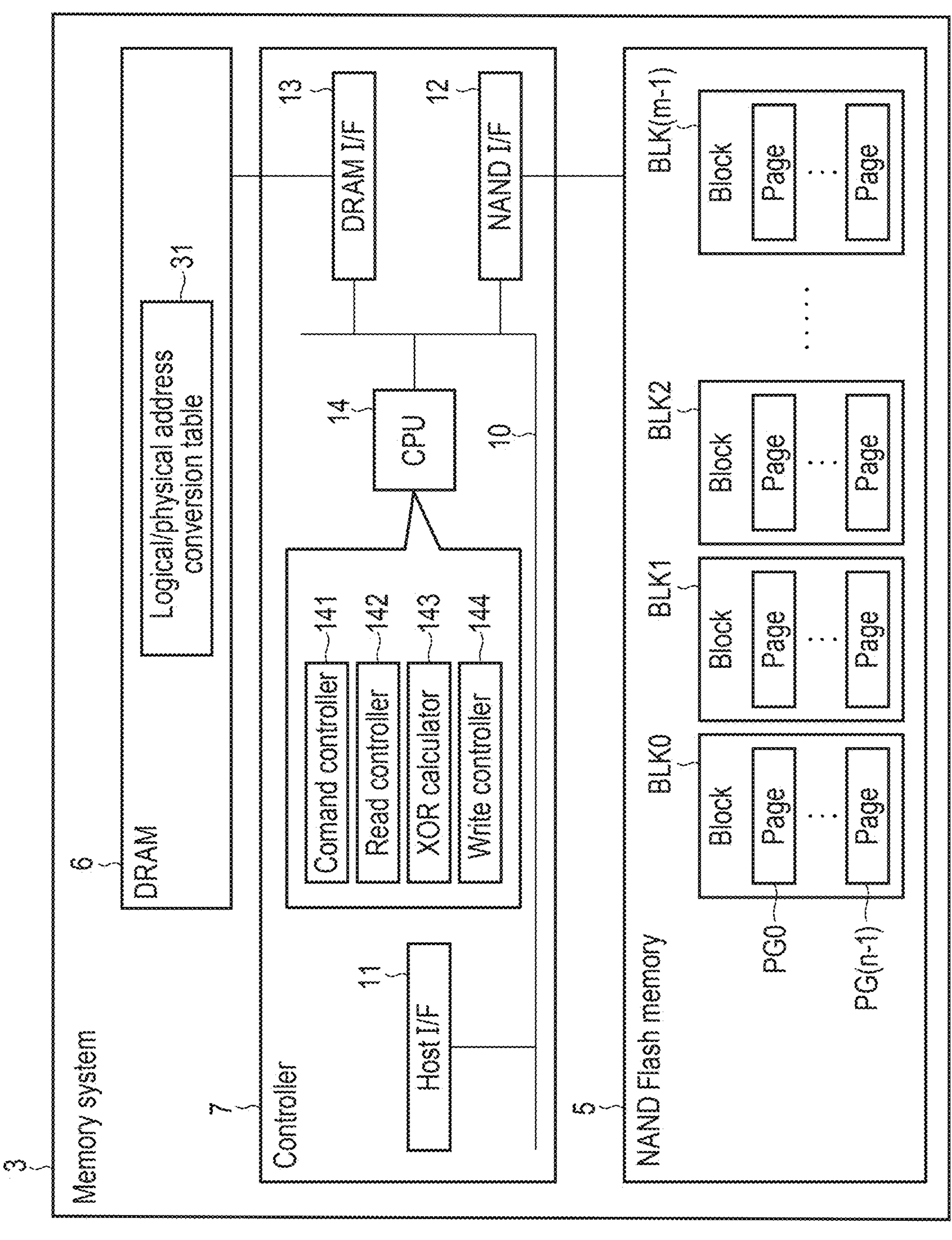
F I G. 2

MEMORY SYSTEM AND INFORMATION PROCESSING SYSTEM

CROSS-REFERENCE TO RELATED APPLICATIONS

This application claims the benefit of U.S. Provisional Application No. 63/687,839, filed Aug. 28, 2024, the entire contents of which are incorporated herein by reference.

FIELD

Embodiments described herein relate generally to a memory system and an information processing system.

BACKGROUND

In recent years, a memory system and an information processing system have been widely prevalent. The memory system includes a nonvolatile memory. The information processing system includes a host. A solid state drive (SSD) including a NAND flash memory is known as such a memory system. The SSD is used as a main storage of various computing devices.

To improve fault tolerance of the information processing system, a redundant array of inexpensive (or independent) disks (RAID) is often used. The RAID relates to a technology of storing data in a plurality of memory systems to improve redundancy and access performance of stored data. For example, in RAID-5, data and parities for data are dispersed and stored in a plurality of memory systems. An example of the parity is an error correction code (ECC). Therefore, for example, even if a memory system which stores some data fails, the data stored in the failed memory system can be rebuilt using other data and parities stored in other memory systems. Another example of the RAID is RAID-6 which stores two parities for data.

BRIEF DESCRIPTION OF THE DRAWINGS

FIG. 1 is a diagram illustrating an example of a configuration of an information processing system according to an embodiment.

FIG. 2 is a block diagram illustrating an example of the configuration of a memory system according to the embodiment.

DETAILED DESCRIPTION

Figure 3:
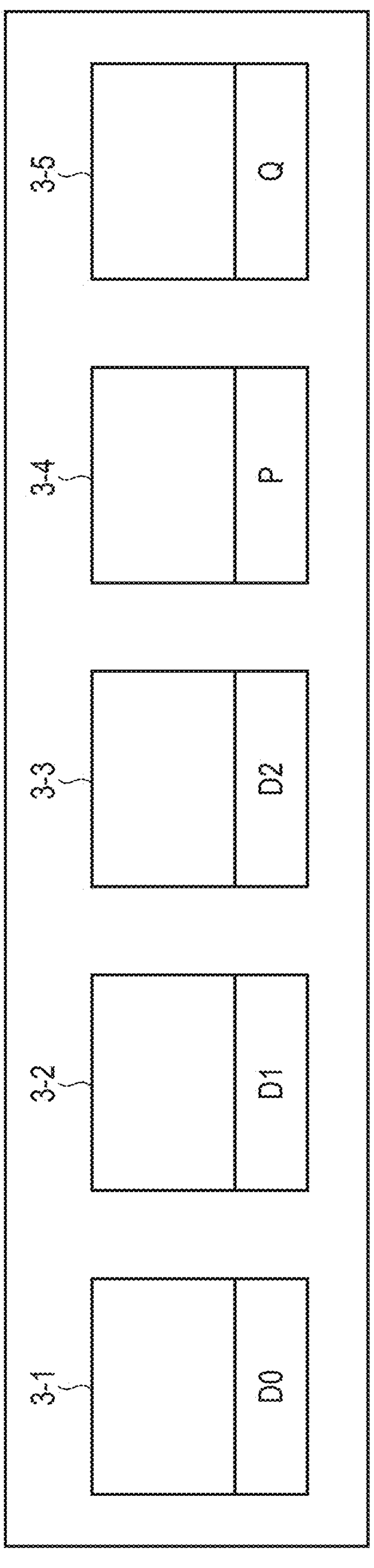
FIG. 3 is a diagram illustrating an example of RAID-6 configured by the memory system according to the embodiment.

Embodiments will be described hereinafter with reference to the accompanying drawings. In the following descriptions, a device and a method are illustrated to embody the technical concept of the embodiments. The technical concept is not limited to the configuration, shape, arrangement, material or the like of the structural elements described below. Modifications that could easily be conceived by a person with ordinary skill in the art are naturally included in the scope of the disclosure. To make the descriptions clearer, the drawings may schematically show the size, thickness, planer dimension, shape, and the like of each element differently from those in the actual aspect. The drawings may include elements that differ in dimension and/or ratio. Elements corresponding to each other in the drawings are denoted by the same reference numeral and their redundant descriptions may be omitted. Some elements may be denoted by different names, and these names are merely an example. It should not be denied that one element is denoted by different names. Note that "connection" means that one element is connected to another element via still another element as well as that one element is directly connected to that another element. If the number of elements is not specified as plural, the elements may be singular or plural.

In general, according to one embodiment, a memory system includes an interface circuit communicable with a host and a plurality of external memory systems, a nonvolatile memory, and a controller. The plurality of external memory systems include at least a first memory system and a second memory system. The controller is configured to generate a first parity based on first data stored in the first memory system and second data stored in the second memory system, write the first parity to the nonvolatile memory, receive third data that is updated data of the first data from the host via the interface circuit, receive the first data from the first memory system via the interface circuit, read the first parity from the nonvolatile memory, generate second parity based on the first parity, the first data, and the third data, generate first rebuilt data based on the second parity, the first parity, and the first data, and compare the first rebuilt data with the third data received from the host.

Example of Configuration of Information Processing System

FIG. 1 is a diagram illustrating an example of a configuration of an information processing system 1 according to an embodiment. The information processing system 1 includes a host device 2, a plurality of memory systems 3, and a switch 4.

The host device 2 may be a storage server, a server, or a personal computer which stores a large amount of various types of data in the plurality of memory systems 3. In this specification, the host device 2 is referred to as a host 2.

The plurality of memory systems 3 constitute RAID-5 or RAID-6. RAID-5, storing one parity for data, includes at least three memory systems. RAID-6, storing two parities for data, includes at least four memory systems. In this specification, an example that the plurality of memory systems 3 constitute RAID-6 will be described. FIG. 1 shows a case where the plurality of memory systems 3 are five memory systems 3-1, 3-2, 3-3, 3-4, and 3-5. In this specification, any one of the plurality of memory systems 3 is also referred to as a memory system 3.

The memory system 3 is a semiconductor storage device configured to write data to a nonvolatile memory and to read data from the nonvolatile memory. The memory system 3 is also referred to as a storage device. An example of the memory system 3 is a solid state drive (SSD). An example of the nonvolatile memory is a NAND flash memory. The memory system 3 can be used as a storage of the host 2. The memory system 3 may be built in the host 2 or connected to the host 2 via a cable or a network.

The switch 4 is a device which connects the host 2 and the plurality of memory systems 3 to each other. The switch 4 comprises a control circuit (not shown) which controls mutual communication between the host 2 and the plurality of memory systems 3.

An interface for connecting the host 2 and the plurality of memory systems 3 via the switch 4 conforms to standards such as PCI Express™ (PCIe™), NVM Express™ (NVMe™), and the like. In this specification, the switch 4 is also referred to as a PCIe switch 4.

Examples of the respective configurations of the host 2 and the memory system 3 will be described below.

Example of Configuration of Host 2

The host 2 may comprise a central processing unit (CPU) 21 and a random access memory (RAM) 22.

The CPU 21 is at least one processor. The CPU 21 controls operations of various components of the host 2. The CPU 21 controls communication between the host 2 and the memory system 3. The CPU 21 transmits various commands to the memory system 3. Examples of the commands transmitted to the memory system 3 include read commands and write commands. The host 2 may also include a control circuit or interface (not shown) that controls communication between the host 2 and the memory system 3. The CPU 21 communicates with the memory system 3 via this control circuit.

The RAM 22 is, for example, a volatile memory. The RAM 22 may be a dynamic random access memory (DRAM) or a static random access memory (SRAM). A storage area of the RAM 22 may be allocated as a buffer area where data is temporarily stored. Data to be written to the memory system 3 and data read from the memory system 3 may be stored in the buffer area.

Example of Configuration of Memory System 3

FIG. 2 is a block diagram illustrating an example of the configuration of the memory system 3 of the embodiment.

The memory system 3 may comprise a nonvolatile memory 5, a volatile memory 6, and a controller 7.

An example of the nonvolatile memory 5 is a NAND flash memory. In this specification, the nonvolatile memory 5 is referred to as a NAND flash memory 5. An example of the volatile memory 6 is a DRAM or SRAM. In this specification, the volatile memory 6 is referred to as a DRAM 6.

The NAND flash memory 5 includes a plurality of blocks BLK0, BLK1, BLK2 . . . , BLK(m−1). Each of the plurality of blocks BLK0, BLK1, BLK2 . . . , BLK(m−1) includes a plurality of pages PG0 . . . , PG(n−1). In this specification, any one of the plurality of blocks is also referred to as a block BLK. Any one of the plurality of pages is also referred to as a page PG. The block BLK functions as the smallest unit for data erase operation. The block BLK is also referred to as an “erase block” or a “physical block”. Each of the plurality of pages PG0 . . . , PG(n−1) includes a plurality of memory cells that are connected in common to a single word line. The page PG functions as a unit for data write operation and data read operation. The word line may also function as a unit for data write operation and data read operation.

A firmware storage area, a cache area for a logical/physical address translation table 31, and a buffer area for temporarily storing data, may be provided in the DRAM 6.

Firmware is a program for controlling the operation of the controller 7. The firmware may be loaded from the NAND flash memory 5 to the DRAM 6 when the memory system 3 is started up.

The logical/physical address translation table 31 manages mapping between each logical address and each physical address of the NAND flash memory 5. The logical address is an address used by the host 2 to address a storage area of the memory system 3. An example of the logical address is a logical block address (LBA).

The controller 7 functions as a memory controller configured to control the NAND flash memory 5. The controller 7 is configured as, for example, a system-on-a-chip (SoC).

Writing data to one page of the NAND flash memory 5 can be executed only once per program/erase cycle (P/E cycle). For this reason, the controller 7 writes updated data corresponding to a certain logical address, not to a physical storage location where the previous data corresponding to this logical address is stored, but to a different physical storage location. The controller 7 invalidates the previous data by updating the logical/physical address translation table 31 to associate this logical address with the different physical storage location. Data referred from the logical/physical address translation table 31 (i.e., data associated with the logical address) is referred to as valid data. In addition, data that is not associated with any logical addresses is referred to as invalid data. The valid data is data that may be requested to be read by the host 2 later. The invalid data is data that may be no longer requested to be read by the host 2.

The controller 7 may include a host interface circuit (host I/F) 11, a NAND interface circuit (NAND I/F) 12, a DRAM interface circuit (DRAM I/F) 13, and a CPU 14. The host I/F 11, the NAND I/F 12, the DRAM I/F 13, and the CPU 14 may be connected via a bus 10.

The host I/F 11 functions as a circuit that receives various commands and data from the host 2 via the PCIe switch 4. The host I/F 11 may also function as a circuit that receives various commands, data, and responses to commands from another memory system 3 via the PCIe switch 4. The host I/F 11 transfers the received commands, data, and responses to the NAND I/F 12, the DRAM I/F 13, or the CPU 14.

The host I/F 11 also functions as a circuit that transfers data and responses to commands to the host 2 via the PCIe switch 4. The host I/F 11 may also function as a circuit that transfers commands, data, and responses to commands to other memory systems 3 via the PCIe switch 4. The host I/F 11 receives commands, data, and responses to be transmitted, from the NAND I/F 12, DRAM I/F 13, or CPU 14.

The NAND I/F 12 electrically connects the controller 7 with the NAND flash memory 5. The NAND I/F 12 conforms to an interface standard such as Toggle DDR and Open NAND Flash Interface (ONFI).

The NAND I/F 12 functions as a NAND control circuit configured to control the NAND flash memory 5. The NAND I/F 12 may be connected to each of a plurality of memory chips in the NAND flash memory 5 via a plurality of channels. By driving the plurality of memory chips in parallel, the bandwidth of access to the NAND flash memory 5 can be increased.

The DRAM I/F 13 functions as a DRAM control circuit configured to control access to the DRAM 6.

The CPU 14 is a processor configured to control the host I/F 11, the NAND I/F 12, and the DRAM I/F 13. The CPU 14 executes various processes by executing the firmware loaded from the NAND flash memory 5 to the DRAM 6. The firmware is a control program that includes an instruction group for causing the CPU 14 to execute various processes. The CPU 14 can execute command processes for processing various commands from the host 2, and the like. The operations of the CPU 14 are controlled by the firmware executed by the CPU 14.

The functions of each unit in the controller 7 may be implemented by dedicated hardware in the controller 7, or may be implemented by the CPU 14 executing the firmware.

The CPU 14 may function as a command controller 141, a read controller 142, an exclusive OR (XOR) calculator 143, and a write controller 144. The CPU 14 may function as each of these units by executing the firmware.

The command controller 141 accepts commands transmitted from the host 2 or other memory systems 3. The command controller 141 controls the read controller 142, the XOR calculator 143, and the write controller 144, based on the accepted commands.

When receiving a read command, the command controller 141 instructs the read controller 142 to read data from the NAND flash memory 5. When receiving a parity generation command, the command controller 141 instructs the XOR calculator 143 to perform XOR calculation on two or more pieces of data. The result of the XOR calculation on the two or more pieces of data is the parity for the two or more pieces of data. The XOR operation result is hereinafter referred to as a parity.

When receiving a write command, the command controller 141 instructs the write controller 144 to write data to the NAND flash memory 5.

The command controller 141 transfers a response to a command to the host 2 or the other memory system 3 which has transmitted the command. The command controller 141 may also transfer commands and data to the other memory system 3. The command controller 141 may also compare two or more pieces of data.

The read controller 142 reads data from the NAND flash memory 5 in response to the instruction from the command controller 141.

The XOR calculator 143 performs the XOR calculation on two or more pieces of data in response to the instruction from the command controller 141, and generates the parity.

The write controller 144 writes data to the DRAM 6 or the NAND flash memory 5 in response to the instruction from the command controller 141.

Example of RAID

FIG. 3 is a diagram illustrating an example of RAID-6 configured by the memory systems 3 of the embodiment. In RAID-6, a parity is generated for each data of certain size (referred to as stripe data) among the data stored in the plurality of memory systems 3. In RAID-6, two types of parity, P and Q, are generated. In the example shown in FIG. 3, RAID-6 is configured by three memory systems 3-1, 3-2, and 3-3 for storage of the data, a memory system 3-4 for storage of the parity P, and a memory system 3-5 for storage of the parity Q. The memory system 3-1 stores data segment D0. The memory system 3-2 stores data segment D1. The memory system 3-3 stores data segment D2. The host 2 or the memory system 3-4 generates the parity P from the stripe data that includes the data segments D0, D1, and D2 stored in the memory systems 3-0, 3-1, and 3-2, respectively. The memory system 3-4 stores the parity P. The host 2 or the memory system 3-5 generates the parity Q from the stripe data that includes the data segments D0, D1, and D2 stored in the memory systems 3-0, 3-1, and 3-2, respectively. The memory system 3-5 stores the parity Q.

(Overview of Partial Update)

The host 2 may write (i.e., overwrite) data with a different value to a logical address range (for example, LBA range) of a certain data segment. This overwriting is referred to as updating the data segment. Updating of part of the data of one stripe data (partial update) stored in a memory system (in this case, data segment D2 stored in the memory system 3-3) among the memory systems constituting RAID-6 will be described. The data segments D0 and D1 are not updated.

When the data segment D2 is updated, the parity P and Q are also updated. To-be-updated parity Old P is represented by Equation 1 using the data segments D0 and D1 and to-be-updated data segment Old D2.

$$\text{Old } P = D0 \oplus D1 \oplus \text{Old } D2 \qquad \text{Equation 1}$$

where, "⊕" represents the exclusive OR.

Updated parity New P is represented by Equation 2 using the data segments D0 and D1 and updated data segment New D2.

$$\text{New } P = D0 \oplus D1 \oplus \text{New } D2 \qquad \text{Equation 2}$$

To-be-updated parity Old Q is represented by Equation 3.

$$\text{Old } Q = g0 \cdot D0 \oplus g1 \cdot D1 \oplus g2 \cdot \text{Old } D2 \qquad \text{Equation 3}$$

where, "." represents a multiplication in Galois field and g0, g1, and g2 are coefficients.

Updated parity New Q is represented by Equation 4.

$$\text{New } Q = g0 \cdot D0 \oplus g1 \cdot D1 \oplus g2 \cdot \text{New } D2 \qquad \text{Equation 4}$$

Equation 4 for obtaining the updated parity New Q is transformed in the following manner.

$$\begin{aligned}\text{New } Q &= g0 \cdot D0 \oplus g1 \cdot D1 \oplus g2 \cdot \text{New } D2 \qquad \text{Equation 5}\\ &= (g0 \cdot D0 \oplus g1 \cdot D1) \oplus g2 \cdot \text{New } D2\\ &= (g0 \cdot D0 \oplus g1 \cdot D1 \oplus g2 \cdot \text{Old } D2 \oplus g2 \cdot \text{Old } D2) \oplus\\ &\quad g2 \cdot \text{New } D2\\ &= (g0 \cdot D0 \oplus g1 \cdot D1 \oplus g2 \cdot \text{Old } D2) \oplus g2 \cdot \text{Old } D2 \oplus\\ &\quad g2 \cdot \text{New } D2\\ &= \text{New } Q' \oplus g2 \cdot \text{New } D2\end{aligned}$$

$$\text{New } Q' = 1 \cdot \text{Old } Q \oplus g2 \cdot \text{Old } D2 \qquad \text{Equation 6}$$

In the partial update of the data D2, Equation 2 for obtaining the updated parity New P is transformed in the following manner, similarly to Equation 5 and Equation 6.

$$\begin{aligned}\text{New } P &= D0 \oplus D1 \oplus \text{New } D2 \qquad \text{Equation 7}\\ &= (D0 \oplus D1) \oplus \text{New } D2\\ &= (D0 \oplus D1 \oplus \text{Old } D2 \oplus \text{Old } D2) \oplus \text{New } D2\end{aligned}$$

-continued $$= (D0 \oplus D1 \oplus \text{Old } D2) \oplus \text{Old } D2 \oplus \text{New } D2$$

$$= \text{Old } P \oplus \text{Old } D2 \oplus \text{New } D2$$

$$= \text{New } P' \oplus \text{New } D2$$

$$\text{New } P' = \text{Old } P \oplus \text{Old } D2 \quad \text{Equation 8}$$

In the partial update of the data segment D2, the updated parity New Q is generated using intermediate data New Q', the updated data segment New D2, and coefficient g2, as represented by Equation 5 and Equation 6. The intermediate data New Q' is calculated from the to-be-updated parity Old Q and the to-be-updated data segment Old D2.

In the partial update of the data segment D2, the updated parity New P is generated using intermediate data New P' and the updated data segment New D2, as represented by Equation 7 and Equation 8. The intermediate data New P' is generated from the to-be-updated parity Old Q and the to-be-updated data segment Old D2.

It is verified whether the updated parities New P and New Q are correct or not. If it is verified that both the updated parities New P and New Q are correct, the updated data segment New D2 is written to the memory system 3-3, the updated parity New P is written to the memory system 3-4, and the updated parity New Q is written to the memory system 3-5.

In the partial update of the data segment D2, the logical address ranges of the to-be-updated data segment Old D2 and the updated data segment New D2 are the same, but the data values in these data segments are different. Similarly, in the partial update of the data segment D0 or D1, the logical address ranges of the to-be-updated data segment Old D0 or Old D1 and the updated data segment New D0 or New D1 are the same, but the data values in these data segments are different.

(Overview of Full Stripe Write)

Updating of the entire data of one stripe data (full stripe write) stored in all of the memory systems 3 constituting RAID-6 will be described. The data segments D0, D1, and D2 are updated.

When the data segments D0, D1, and D2 are updated, the parities P and Q are also updated. The to-be-updated parity Old P is represented by Equation 9 using the to-be-updated data segments Old D0, Old D1, and Old D2.

$$\text{Old } P = \text{Old } D0 \oplus \text{Old } D1 \oplus \text{Old } D2 \quad \text{Equation 9}$$

The updated parity New P is represented by Equation 10 using the updated data segments New D0, New D1, and New D2.

$$\text{New } P = \text{New } D0 \oplus \text{New } D1 \oplus \text{New } D2 \quad \text{Equation 10}$$

The to-be-updated parity Old Q is represented by Equation 11.

$$\text{Old } Q = g0 \cdot \text{Old } D0 \oplus g1 \cdot \text{Old } D1 \oplus g2 \cdot \text{Old} \quad \text{Equation 11}$$

The updated parity New Q is represented by Equation 12.

$$\text{New } Q = g0 \cdot \text{New } D0 \oplus g1 \cdot \text{New } D1 \oplus g2 \cdot \text{New } D2 \quad \text{Equation 12}$$

Equation 12 for obtaining the updated parity New Q is transformed in the following manner.

$$\text{New } Q = g0 \cdot \text{New } D0 \oplus g1 \cdot \text{New } D1 \oplus g2 \cdot \text{New } D2 \quad \text{Equation 13}$$

$$= \text{New } Q'' \oplus g2 \cdot \text{New } D2$$

$$\text{New } Q'' = g0 \cdot \text{New } D0 \oplus g1 \cdot \text{New } D1 \quad \text{Equation 14}$$

In the full stripe write, Equation 10 for obtaining the updated parity New P is transformed in the following manner, similarly to Equation 13 and Equation 14.

$$\text{New } P = \text{New } D0 \oplus \text{New } D1 \oplus \text{New } D2 \quad \text{Equation 15}$$

$$= \text{New } P'' \oplus \text{New } D2$$

$$\text{New } P'' = \text{New } D0 \oplus \text{New } D1 \quad \text{Equation 16}$$

In the full stripe write, the updated parity New Q is generated using the intermediate data New Q", the updated data segment New D2, and the coefficient g2, as represented by Equation 13 and Equation 14. The intermediate data New Q" is calculated from the updated data segment New D0, the updated data segment New D1, and the coefficients g0 and g1.

In the full stripe write, the updated parity New P is generated using the intermediate data New P" and the updated data segment New D2, as represented by Equation 15 and Equation 16. The intermediate data New P" is calculated from the updated data segment New D0 and the updated data segment New D1.

In the full stripe write as well, it is verified whether the updated parities New P and New Q are correct or not. If it is verified that both the updated parities New P and New Q are correct, the updated data segment New D0 is written to the memory system 3-1, the updated data segment New D1 is written to the memory system 3-2, the updated data segment New D2 is written to the memory system 3-3, the updated parity New P is written to the memory system 3-4, and the updated parity New Q is written to the memory system 3-5.

The above description relates to verifying the updated parity when updating data, but the initial parity generated when writing data for the first time is also verified similarly. In the first data write, description of the full stripe write is applied since new data segments are written to the memory systems 3-1, 3-2, and 3-3.

(Overview of Parity Verification)

In the partial update, the updated parity New Q is generated from the intermediate data New Q', the updated data segment New D2, and the coefficient g2, as represented by Equation 5. Therefore, the memory system 3-5 can rebuild the updated data segment New D2 from the updated parity New Q, the intermediate data New Q', and the coefficient g2, as rebuilt data segment Rebuild D2(Q), as represented by Equation 17.

$$\text{Rebuild } D2(Q) = (\text{New } Q/g2) \oplus (\text{New } Q'/g2) \quad \text{Equation 17}$$

where, "/" represents a division in Galois field.

The intermediate data New Q' is calculated from the to-be-updated parity Old Q, the to-be-updated data segment Old D2, and the coefficient g2, as represented by Equation 6.

If the rebuilt data segment Rebuild D2(Q), which is rebuilt from the updated parity New Q using Equation 17, matches the updated data segment New D2, it is determined that the updated parity New Q is correct.

In the partial update, the updated parity New P is generated from the intermediate data New P' and the updated data segment New D2, as represented by Equation 7. Therefore, the memory system 3-4 can rebuild the updated data segment New D2 from the updated parity New P and the intermediate data New P', as the rebuilt data segment Rebuild D2(P), as represented by Equation 18.

$$\text{Rebuild } D2(P) = \text{New } P \oplus \text{New } P' \quad \text{Equation 18}$$

The intermediate data New P' is generated from the to-be-updated parity Old P and the to-be-updated data segment Old D2, as represented by Equation 8.

If the rebuilt data segment Rebuild D2(P), which is rebuilt from the updated parity New P using Equation 18, matches the updated data segment New D2, it is determined that the updated parity New P is correct.

The above description of the partial update is a description in a case where the data segment D2 is updated. In the partial update where the data segment D0 or D1 is updated, the memory system 3-5 can determine whether the updated parity New Q is correct or not, by rebuilding the updated data segment New D0 or New D1 as the rebuilt data segment Rebuild D0(Q) or Rebuild D1(Q) as represented by Equation 17 and comparing the rebuilt data segment Rebuild D0(Q) or Rebuild D1(Q) with the updated data segment New D0 or New D1. Similarly, the memory system 3-4 can determine whether the updated parity New P is correct or not, by rebuilding the updated data segment New D0 or New D1 as the rebuilt data segment Rebuild D0(P) or Rebuild D1(P) as represented by Equation 18 and comparing the rebuilt data segment Rebuild D0(P) or Rebuild D1(P) with the updated data segment New D0 or New D1.

In the full stripe write, the updated parity New Q is generated from the intermediate data New Q", the updated data segment New D2, and the coefficient g2, as represented by Equation 13. Therefore, the memory system 3-5 can rebuild the updated data segment New D2 from the updated parity New Q, the intermediate data New Q", and the coefficient g2, as rebuilt data segment Rebuild D2(Q), as represented by Equation 19.

$$\text{Rebuild } D2(Q) = (\text{New } Q/g2) \oplus (\text{New } Q''/g2) \quad \text{Equation 19}$$

The intermediate data New Q" is generated calculated from the updated data segments New D0 and New D1 and the coefficients g0 and g1, as represented by Equation 14.

If the rebuilt data segment Rebuild D2(Q), which is rebuilt from the updated parity New Q using Equation 17, matches the updated data segment New D2, it is determined that the updated parity New Q is correct.

In the full stripe write, the updated parity New P is generated from the intermediate data New P" and the updated data segment New D2, as represented by Equation 15. Therefore, the memory system 3-4 can rebuild the updated data segment D2 from the updated parity New P and the intermediate data New P", as the rebuilt data segment Rebuild D2(P), as represented by Equation 20.

$$\text{Rebuild } D2(P) = \text{New } P \oplus \text{New } P'' \quad \text{Equation 20}$$

The intermediate data New P" is calculated from the updated data segments New D0 and New D1, as represented by Equation 16.

If the rebuilt data segment Rebuild D2(P), which is rebuilt from the updated parity New P, matches the updated data segment New D2, it is determined that the updated parity New P is correct.

In the full stripe write, the verification of the updated parity may be performed by rebuilding the data segment D0 or D1, rather than the data segment D2. In other words, the memory system 3-5 can determine whether the updated parity New Q is correct or not, by rebuilding the updated data segment New D0 or New D1 as the rebuilt data segment Rebuild D0(Q) or Rebuild D1(Q) as represented by Equation 19 and comparing the rebuilt data segment Rebuild D0(Q) or Rebuild D1(Q) with the updated data segment New D0 or New D1. Similarly, the memory system 3-4 can determine whether the updated parity New P is correct or not, by rebuilding the updated data segment New D0 or New D1 as the rebuilt data segment Rebuild D0(P) or Rebuild D1(P) as represented by Equation 20 and comparing the rebuilt data segment Rebuild D0(P) or Rebuild D1(P) with the updated data segment New D0 or New D1.

(Processing of Partial Update)

Figure 4:
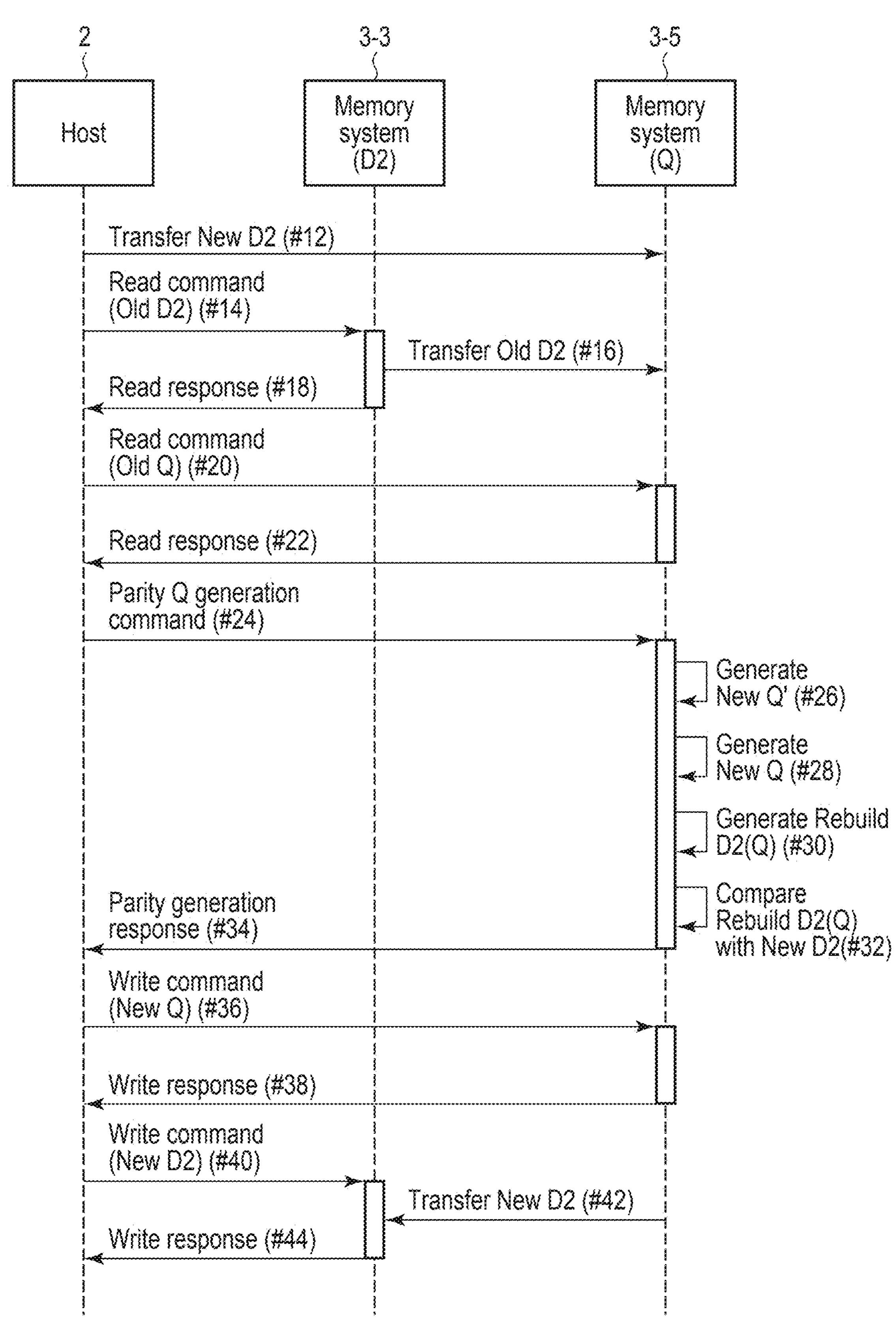
FIG. 4 is a flowchart illustrating an example of a processing sequence of partial update according to the embodiment.

FIG. 4 is a flowchart illustrating an example of a processing sequence of the partial update according to the embodiment. FIG. 4 shows an example in which the data segment D2 stored in the memory system 3-3 is updated and the data segments D0 and D1 stored in the memory systems 3-1 and 3-2, respectively, are not updated. To simplify the description, the generation, verification and updating of the parity P are omitted in FIG. 4.

When updating the data segment D2, the host 2 transfers the updated data segment New D2 to the memory system 3-5 to store the data segment New D2 in the DRAM 6 (step #12).

The host 2 transfers a read command to read the to-be-updated data segment Old D2, to the memory system 3-3 (#14). This read command includes an instruction to transfer the read to-be-updated data segment Old D2 to the memory system 3-5.

The read controller 142 of the memory system 3-3 reads the to-be-updated data segment Old D2 from the NAND flash memory 5. The command controller 141 of the memory system 3-3 transfers the to-be-updated data segment Old D2 to the memory system 3-5 to store the data segment Old D2 in the DRAM 6 of the memory system 3-5 (step #16). The command controller 141 of the memory system 3-3 transfers a read response indicative of completion of the reading to the host 2 (#18).

The host 2 transfers a read command to read the to-be-updated parity Old Q, to the memory system 3-5 (#20). This read command includes an instruction to store the read to-be-updated parity Old Q in the DRAM 6.

The read controller 142 of the memory system 3-5 reads the to-be-updated parity Old Q from the NAND flash memory 5. The read controller 142 of the memory system 3-5 stores the read to-be-updated parity Old Q in the DRAM 6. The command controller 141 of the memory system 3-5 transfers a read response indicative of completion of the reading to the host 2 (#22).

The host 2 transfers a parity Q generation command to the memory system 3-5 (#24). The parity Q generation command specifies the coefficients g0, g1, and g2.

The XOR calculator 143 of the memory system 3-5 calculates the intermediate data New Q' for generation of the updated parity New Q, based on Equation 6, using the to-be-updated parity Old Q, the to-be-updated data segment Old D2, and the coefficient g2 (#26).

The XOR calculator 143 of the memory system 3-5 calculates the updated parity New Q, based on Equation 5, using the intermediate data New Q', the updated data segment New D2, and the coefficient g2 (#28).

The XOR calculator 143 of the memory system 3-5 calculates the rebuilt data segment Rebuild D2(Q), based on Equation 17, using the updated parity New Q, the intermediate data New Q', and the coefficient g2 (#30).

The command controller 141 of the memory system 3-5 compares the calculated rebuilt data segment Rebuild D2(Q) with the updated data segment New D2 (#32). If both of them match, the command controller 141 of the memory system 3-5 determines that the generation of the parity Q is successful. If both of them do not match, the command controller 141 of the memory system 3-5 determines that the generation of the parity Q fails.

The command controller 141 of the memory system 3-5 transfers a parity generation response indicative of success or failure in generation of the parity Q, to the host 2 (#34). If receiving a response indicative of failure in generation of the parity Q, the host 2 may retransfer the parity Q generation command to the memory system 3-5 again, notify the user of an error, or stop writing to the memory system 3-3.

If receiving a response indicative of success in generation of the parity Q, the host 2 transfers a write command to write the updated parity New Q, to the memory system 3-5 (#36). The write controller 144 of the memory system 3-5 writes the updated parity New Q to the NAND flash memory 5.

The command controller 141 of the memory system 3-5 transfers a write response indicative of completion of the writing to the host 2 (#38).

The host 2 transfers a write command to write the updated data segment New D2, to the memory system 3-3 (#40). This write command includes an instruction to receive the updated data segment New D2 from the memory system 3-5. The command controller 141 of the memory system 3-3 reads the updated data segment New D2 stored in the DRAM 6 of the memory system 3-5. The updated data segment New D2 is transferred from the memory system 3-5 to the memory system 3-3 (#42). The write controller 144 of the memory system 3-3 writes the updated data segment New D2 to the NAND flash memory 5. Alternatively, the host 2 may transfer the updated data segment New D2 to the memory system 3-3 along with the write command (#40) for writing the updated data segment New D2. In this case, reading the updated data segment New D2 from the memory system 3-5 and transfer of the updated data segment New D2 to the memory system 3-3 (#42) is unnecessary.

The command controller 141 of the memory system 3-3 transfers a write response indicative of completion of the writing to the host 2 (#44).

The host 2 transfers, verifies, and updates the parity generation command to the memory system 3-4 for the parity P in the same manner as the parity Q.

(Processing of Full Stripe Write)

Figure 5:
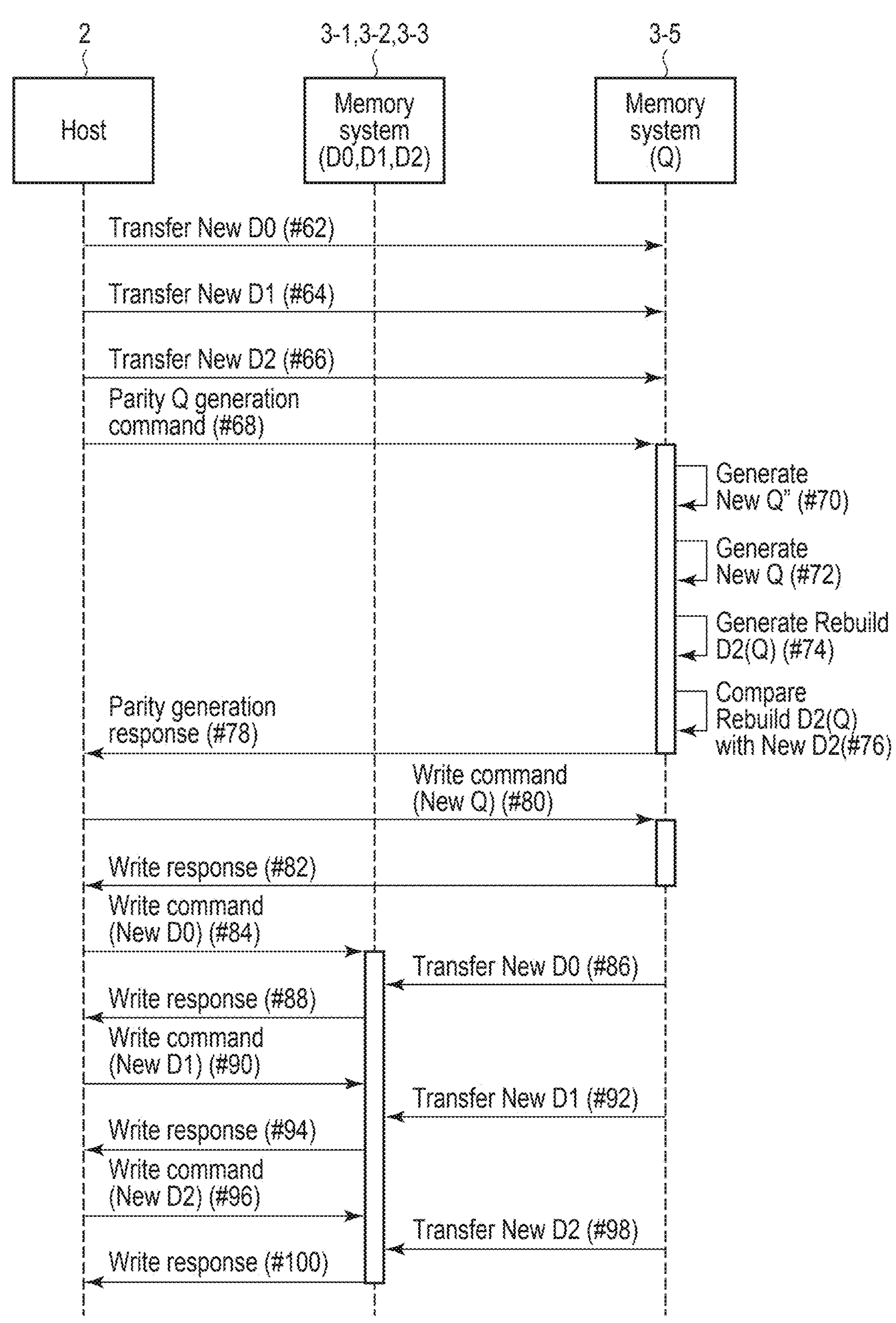
FIG. 5 is a flowchart illustrating an example of a processing sequence of full stripe write according to the embodiment.

FIG. 5 is a flowchart illustrating an example of a processing sequence of the full stripe write. FIG. 5 shows an example of updating the data segments D0, D1, and D2 respectively stored in the memory systems 3-1, 3-2, and 3-3 which constitute the stripe data. To simplify the description, the generation, verification and updating of the parity P are omitted in FIG. 5.

When the data segments D0, D1, and D2 are updated, the host 2 transfers the updated data segments New D0, New D1, and New D2 to the memory system 3-5 to store the data segments New D0, New D1, and New D2 in the DRAM 6 of the memory system 3-5 (steps #62, #64, and #66).

The host 2 transfers a parity Q generation command to the memory system 3-5 (#68). The parity Q generation command specifies the coefficients g0, g1, and g2.

The XOR calculator 143 of the memory system 3-5 calculates the intermediate data New Q" for generation of the updated parity New Q, based on Equation 14, using the updated data segments New D0 and New D1, and the coefficients g0 and g1 (#70).

The XOR calculator 143 of the memory system 3-5 calculates the updated parity New Q, based on Equation 13, using the intermediate data New Q", the updated data segment New D2, and the coefficient g2 (#72).

The XOR calculator 143 of the memory system 3-5 calculates the rebuilt data segment Rebuild D2(Q), based on Equation 19, using the updated parity New Q, the intermediate data New Q", and the coefficient g2 (#74).

The command controller 141 of the memory system 3-5 compares the calculated rebuilt data segment Rebuild D2(Q) with the updated data segment New D2 (#76). If both of them match, the command controller 141 of the memory system 3-5 determines that the generation of the parity Q is successful. If both of them do not match, the command controller 141 of the memory system 3-5 determines that the generation of the parity Q fails.

The command controller 141 of the memory system 3-5 transfers a parity generation response indicative of success or failure in generation of the parity Q, to the host 2 (#78). If receiving a response indicative of failure in generation of the parity Q, the host 2 may retransfer the parity generation command to the memory system 3-5 again, notify the user of an error, or stop writing to the memory systems 3-1, 3-2, and 3-3.

If receiving a response indicative of success in generation of the parity Q, the host 2 transfers a write command to write the updated parity New Q, to the memory system 3-5 (#80). The write controller 144 of the memory system 3-5 writes the updated parity New Q to the NAND flash memory 5.

The command controller 141 of the memory system 3-5 transfers a write response indicative of completion of the writing to the host 2 (#82).

The host 2 transfers write commands to write the updated data segments New D0, New D1, and New D2, to the memory systems 3-1, 3-2, and 3-3, respectively (#84, #90, and #96). These write commands include instructions to receive the respective updated data segments New D0, New D1, and New D2 from the memory system 3-5. The command controllers 141 of the memory systems 3-1, 3-2, and 3-3 read the updated data segments New D0, New D1, and New D2 stored in the DRAM 6 of the memory system 3-5, respectively. The updated data segments New D0, New D1, and New D2 are transferred from the memory system 3-5 to the memory systems 3-1, 3-2, and 3-3, respectively (#86, #92, and #98). The write controllers 144 of the memory systems 3-1, 3-2, and 3-3 write the updated data segments New D0, New D1, and New D2 to the NAND flash memories 5, respectively. Alternatively, the host 2 may transfer the updated data segments New D0, New D1, and New D2 to the memory systems 3-1, 3-2, and 3-3 along with the write commands (#84, #90, and #96) for writing the updated data segments New D0, New D1, and New D2, respectively. In this case, reading the updated data segments New D0, New D1, and New D2 from the memory system 3-5 and respective transfers of the updated data segment New D0, New D1, and New D2 to the memory systems 3-1, 3-2, and 3-3 (#86, #92, and #98) are unnecessary.

The command controllers 141 of the memory systems 3-1, 3-2, and 3-3 transfer write responses indicative of completion of the writing to the host 2 (#88, #94, and #100).

The host 2 transfers, verifies, and updates the generation command to the memory system 3-4 for the parity P in the same manner as the parity Q.

The example in which the three updated data segments are updated sequentially in chronological order has been described in FIG. 5, but is not limited to this, and the three updated data segments may be updated simultaneously in parallel.

The example that the plurality of memory systems 3 constitute RAID-6 has been described above, but the plurality of memory systems 3 may constitute RAID-5 in the same manner. RAID-5 includes the memory systems 3-1, 3-2, and 3-3 for storage of data and the memory system 3-4 for storage of the parity P.

According to at least one embodiment described above, the memory system can verify whether the generated parity is correct or not. Therefore, the reliability of the information processing system configured to include the memory system according to the embodiment can be improved.

According to at least one embodiment described above, the memory system 3-4 or 3-5 comprises the interface circuit 11 communicable with the host 2 and a plurality of external memory systems 3-1, 3-2, and 3-3, the NAND flash memory 5 serving as a nonvolatile memory, and the controller 7. The controller 7 generates the first parity Old Q, based on the first data Old D2 stored in the first memory system 3-3 among the plurality of external memory systems 3 and the second data Old D1 stored in the second memory system 3-2 among the plurality of external memory systems 3, and writes the first parity Old Q to the NAND flash memory 5. In the partial update in which the first data Old D2 is updated to the third data New D2, the controller 7 is configured to receive the third data New D2, which is the updated data of the first data Old D2, from the host 2 via the interface circuit 11, receive the first data Old D2 from the first memory system 3-3 via the interface circuit 11, read the first parity Old Q from the NAND flash memory 5, generate the second parity New Q, based on the first parity Old Q, the first data Old D2, and the third data New D2, calculate the first rebuilt data Rebuild D2(Q), based on the second parity New Q, the first parity Old Q, and the first data Old D2, and compare the first rebuilt data Rebuild D2(Q) with the third data New D2 received from the host 2.

In the full stripe write in which the first data Old D2 is updated to the third data New D2 and the second data Old D1 is updated to the fourth data New D1, the controller 7 is further configured to receive the fourth data New D1, which is the updated data of the second data Old D1, from the host 2 via the interface circuit 11, generate the third parity New Q, based on the third data New D2 and the fourth data New D1, generate the second rebuilt data Rebuild D2(Q), based on the third parity New Q and the fourth data New D1, and compare the second rebuilt data Rebuild D2(Q) with the third data New D2 received from the host 2.

In the first data write, the controller 7 is further configured to receive the first data Old D2 from the host 2 via the interface circuit 11, receive the second data Old D1 from the host 2 via the interface circuit 11, generate the first parity Old Q, based on the first data Old D2 and the second data Old D1, generate the third rebuilt data Rebuild D2(Q), based on the first parity Old Q and the second data Old D1, and compare the third rebuilt data Rebuild D2(Q) with the first data Old D2 received from the host 2.

According to at least one embodiment described above, the information processing system 1 comprises the host 2, and the plurality of memory systems 3 each including the NAND flash memory 5 serving as a nonvolatile memory and the controller 7 electrically connected to the NAND flash memory 5. The plurality of memory systems 3 include at least the first memory system 3-3, the second memory system 3-2, and the third memory system 3-5. The first controller 7, which is the controller 7 of the first memory system 3-3, is configured to store the first data Old D2 in the first NAND flash memory 5, which is the NAND flash memory 5 of the first memory system 3-3. The second controller 7, which is the controller 7 of the second memory system 3-2, is configured to store the second data Old D1 in the second NAND flash memory 5, which is the NAND flash memory 5 of the second memory system 3-2. The third controller 7, which is the controller 7 of the third memory system 3-5, generates the first parity Old Q, based on the first data Old D2 and the second data Old D1, and stores the first parity Old Q in the third NAND flash memory 5, which is the NAND flash memory 5 of the third memory system 3-5. In the partial update in which the first data Old D2 is updated to the third data New D2, the third controller 7 is configured to receive the third data New D2, which is the updated data of the first data Old D2, from the host 2, receive the first data Old D2 from the first controller 7, read the first parity Old Q from the third NAND flash memory 5, generate the second parity New Q, based on the first parity Old Q, the first data Old D2, and the third data New D2, generate the first rebuilt data Rebuild D2(Q), based on the second parity New Q, the first parity Old Q, and the first data Old D2, and compare the first rebuilt data Rebuild D2(Q) with the third data New D2 received from the host 2.

In the full stripe write in which the first data Old D2 is updated to the third data New D2 and the second data Old D1 is updated to the fourth data New D1, the third controller 7 of the third memory system 3-5 is further configured to receive the fourth data New D1, which is the updated data of the second data Old D1, from the host 2 via the interface circuit 11, generate the third parity New Q, based on the third data New D2 and the fourth data New D1, generate the second rebuilt data Rebuild D2(Q), based on the third parity New Q and the fourth data New D1, and compare the second rebuilt data Rebuild D2(Q) with the third data New D2 received from the host 2.

In the first data write, the third controller 7 of the third memory system 3-5 is further configured to receive the first data Old D2 from the host 2, receive the second data Old D1 from the host 2, generate the first parity Old Q, based on the first data Old D2 and the second data Old D1, generate the third rebuilt data Rebuild D2(Q), based on the first parity Old Q and the second data Old D1, and compare the third rebuilt data Rebuild D2(Q) with the first data Old D2 received from the host 2.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system comprising:

an interface circuit communicable with a host and a plurality of external memory systems, the plurality of external memory systems including at least a first memory system and a second memory system;

a nonvolatile memory; and a controller configured to:

generate a first parity, based on first data stored in the first memory system and second data stored in the second memory system;

write the first parity to the nonvolatile memory;

receive third data from the host via the interface circuit, the third data being updated data of the first data;

receive the first data from the first memory system via the interface circuit;

read the first parity from the nonvolatile memory;

generate a second parity, based on the first parity, the first data, and the third data;

generate first rebuilt data, based on the second parity, the first parity, and the first data; and compare the first rebuilt data with the third data received from the host.

2. The memory system of claim 1, wherein the controller is further configured to write the second parity to the nonvolatile memory if the first rebuilt data matches the third data received from the host.

3. The memory system of claim 2, wherein the controller is further configured to:

transfer a first response indicative of success in generation of the second parity to the host via the interface circuit if the first rebuilt data matches the third data received from the host; and transfer a second response indicative of failure in generation of the second parity to the host via the interface circuit if the first rebuilt data does not match the third data received from the host.

4. The memory system of claim 1, wherein the controller is further configured to generate the first parity by calculating exclusive OR of the first data and the second data.

5. The memory system of claim 4, wherein the controller is further configured to generate the second parity by calculating exclusive OR of the first parity, the first data, and the third data.

6. The memory system of claim 1, wherein the controller is further configured to:

receive fourth data from the host via the interface circuit, the fourth data being updated data of the second data;

generate a third parity, based on the third data and the fourth data;

generate second rebuilt data, based on the third parity and the fourth data; and compare the second rebuilt data with the third data received from the host.

7. The memory system of claim 6, wherein the controller is further configured to write the third parity to the nonvolatile memory if the second rebuilt data matches the third data received from the host.

8. The memory system of claim 7, wherein the controller is further configured to:

transfer a third response indicative of success in generation of the third parity to the host via the interface circuit if the second rebuilt data matches the third data received from the host; and transfer a fourth response indicative of failure in generation of the third parity to the host via the interface circuit if the second rebuilt data does not match the third data received from the host.

9. The memory system of claim 1, wherein the controller is further configured to:

receive the first data from the host via the interface circuit;

receive the second data from the host via the interface circuit;

generate the first parity, based on the first data and the second data;

generate third rebuilt data, based on the first parity and the second data; and compare the third rebuilt data with the first data received from the host.

10. The memory system of claim 1, wherein the controller is further configured to transfer the third data received from the host, to the first memory system via the interface circuit.

11. An information processing system, comprising:

a host; and a plurality of memory systems each including a nonvolatile memory and a controller electrically connected to the nonvolatile memory, the plurality of memory systems including at least a first memory system, a second memory system, and a third memory system;

a first controller that is the controller of the first memory system is configured to store first data in a first nonvolatile memory that is the nonvolatile memory of the first memory system;

a second controller that is the controller of the second memory system is configured to store second data in a second nonvolatile memory that is the nonvolatile memory of the second memory system;

a third controller that is the controller of the third memory system is configured to:

generate a first parity, based on the first data and the second data;

store the first parity in a third nonvolatile memory that is the nonvolatile memory of the third memory system;

receive third data from the host, the third data being updated data of the first data;

receive the first data from the first controller;

read the first parity from the third nonvolatile memory;

generate a second parity, based on the first parity, the first data, and the third data;

generate first rebuilt data, based on the second parity, the first parity, and the first data; and compare the first rebuilt data with the third data received from the host.

12. The information processing system of claim 11, wherein the third controller is further configured to transfer a first response indicative of success in generation of the second parity to the host if the first rebuilt data matches the third data received from the host;

the host is further configured to transfer a first write command requesting to write the second parity to the third memory system, in response to receiving the first response; and the third controller is further configured to write the second parity to the third nonvolatile memory in response to receiving the first write command.

13. The information processing system of claim 11, wherein the third controller is further configured to transfer a second response indicative of failure in generation of the second parity to the host if the first rebuilt data does not match the third data received from the host.

14. The information processing system of claim 11, wherein the third controller is further configured to:

generate the first parity by calculating exclusive OR of the first data and the second data; and generate the second parity by calculating exclusive OR of the first parity, the first data, and the third data.

15. The information processing system of claim 11, wherein the third controller is further configured to:

receive fourth data from the host, the fourth data being updated data of the second data;

generate a third parity, based on the third data and the fourth data;

generate second rebuilt data, based on the third parity and the fourth data; and compare the second rebuilt data with the third data received from the host.

16. The information processing system of claim 15, wherein the third controller is further configured to transfer a third response indicative of success in generation of the third parity to the host if the second rebuilt data matches the third data received from the host;

the host is further configured to transfer a second write command requesting to write the third parity to the third memory system, in response to receiving the third response; and the third controller is further configured to write the third parity to the third nonvolatile memory in response to receiving the second write command.

17. The information processing system of claim 11, wherein the third controller is further configured to:

receive the first data from the host;

receive the second data from the host;

generate the first parity, based on the first data and the second data;

generate third rebuilt data, based on the first parity and the second data; and compare the third rebuilt data with the first data received from the host.

18. The information processing system of claim 11, wherein the third controller is further configured to transfer the third data received from the host, to the first controller.

19. The information processing system of claim 11, wherein the plurality of memory systems further include a fourth memory system, and a fourth controller that is the controller of the fourth memory system is configured to:

generate a fourth parity, based on the first data and the second data;

store the fourth parity in a fourth nonvolatile memory that is the nonvolatile memory of the fourth memory system;

receive the third data from the host;

receive the first data from the first controller;

generate a fifth parity, based on the fourth parity, the first data, and the third data;

generate fourth rebuilt data, based on the fifth parity, the fourth parity, and the first data; and compare the fourth rebuilt data with the third data received from the host.

20. The information processing system of claim 19, wherein the fourth controller is configured to:

generate the fourth parity by calculating exclusive OR of the first data and the second data using a coefficient different from a coefficient used for generation of the first parity; and generate the fifth parity by calculating exclusive OR of the fourth parity, the first data, and the third data using a coefficient different from a coefficient used for generation of the second parity.

* * * * *